June 15, 1943.   D. M. McBEAN   2,321,838
COFFEE BIN
Filed March 19, 1940   5 Sheets-Sheet 1
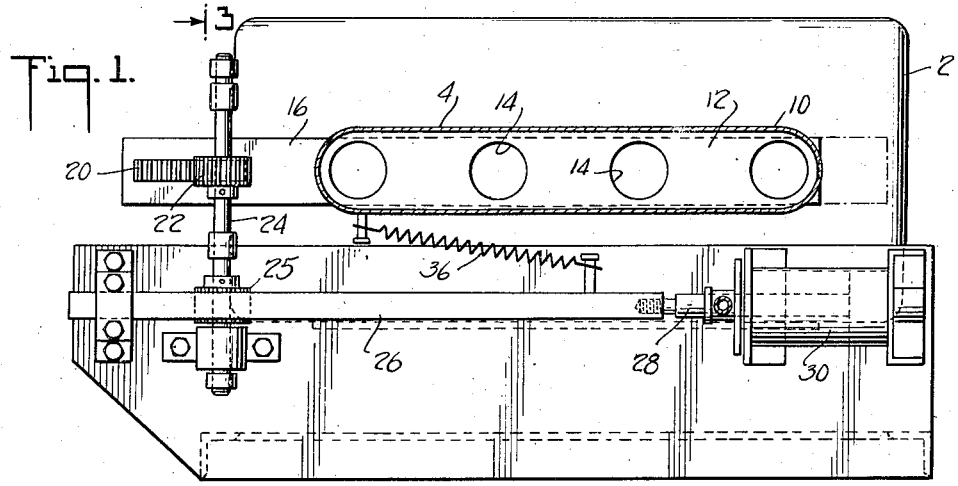
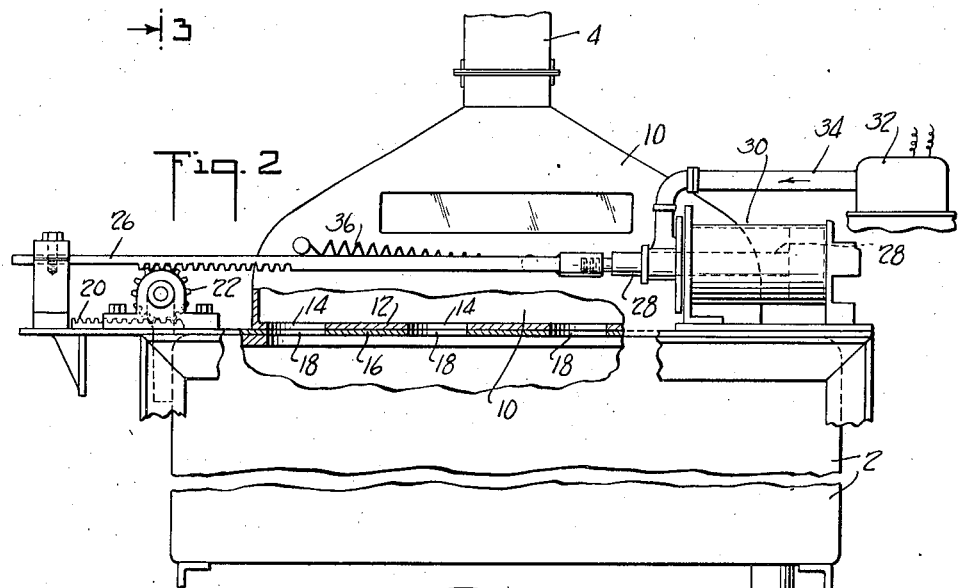
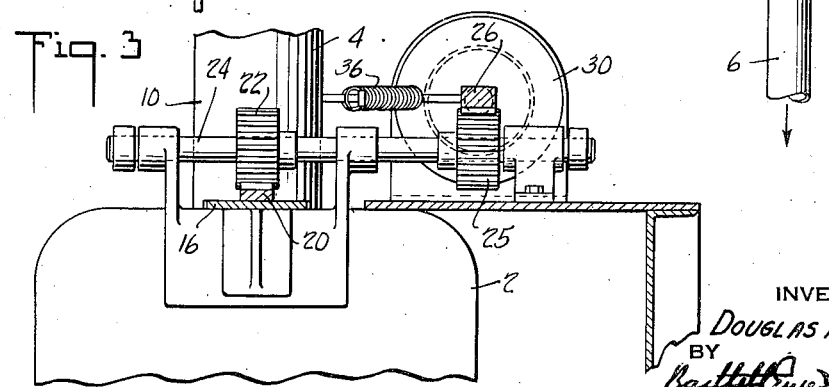
INVENTOR
Douglas M. McBean
BY
ATTORNEYS June 15, 1943.  D. M. McBEAN  2,321,838
COFFEE BIN
Filed March 19, 1940  5 Sheets-Sheet 2
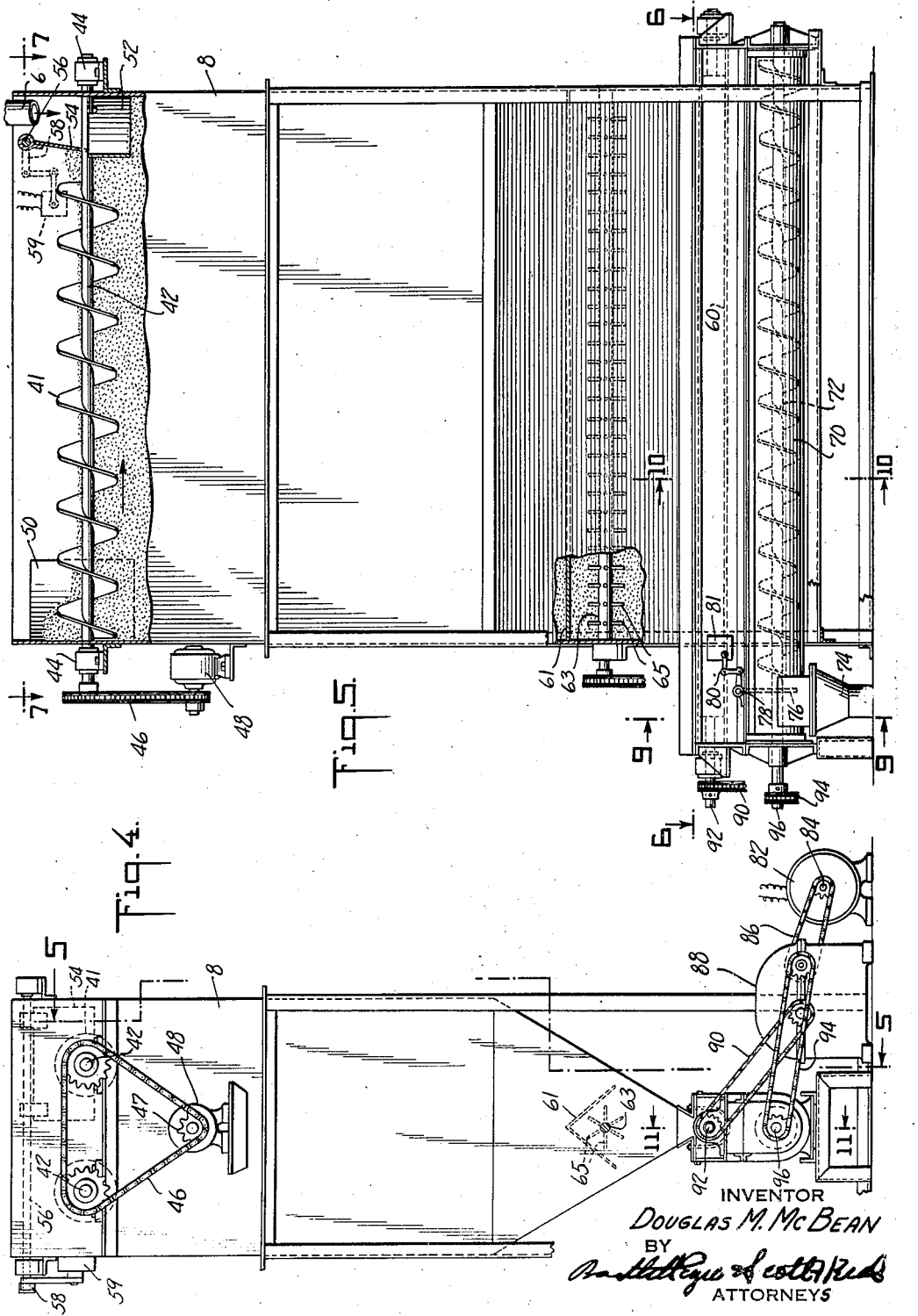
INVENTOR
DOUGLAS M. McBEAN
BY
ATTORNEYS June 15, 1943.   D. M. McBEAN   2,321,838
COFFEE BIN
Filed March 19, 1940   5 Sheets-Sheet 3
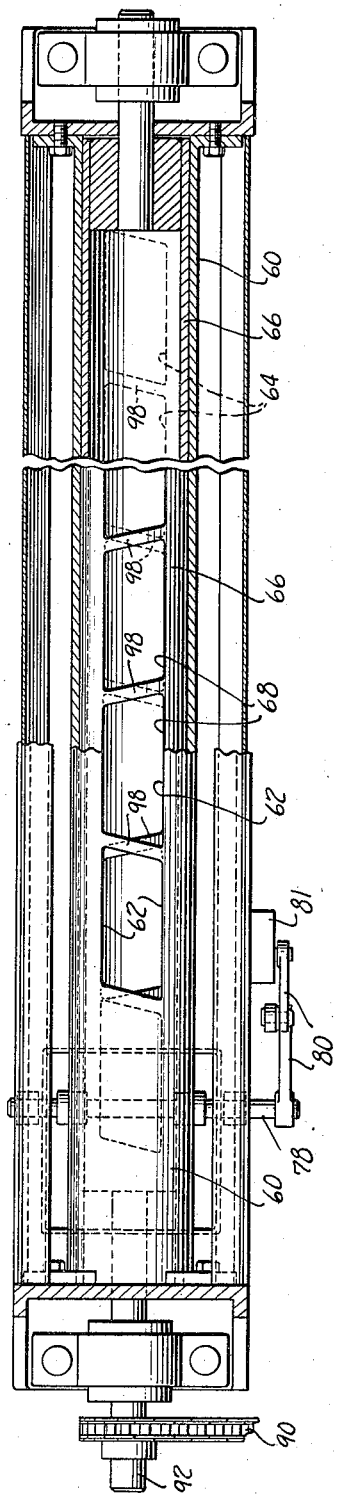
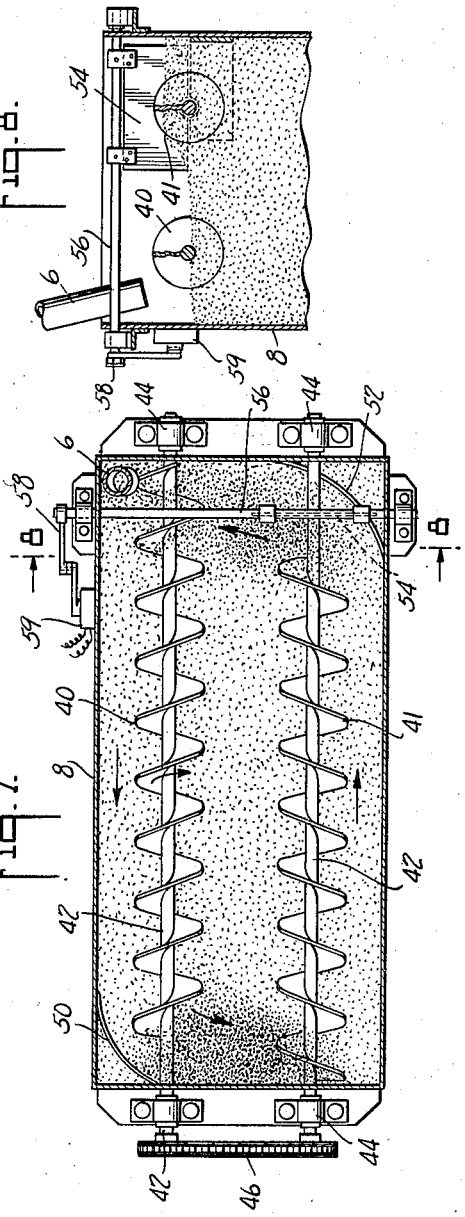
INVENTOR
DOUGLAS M. McBEAN
BY
ATTORNEYS June 15, 1943.  D. M. McBEAN  2,321,838
COFFEE BIN
Filed March 19, 1940  5 Sheets-Sheet 4
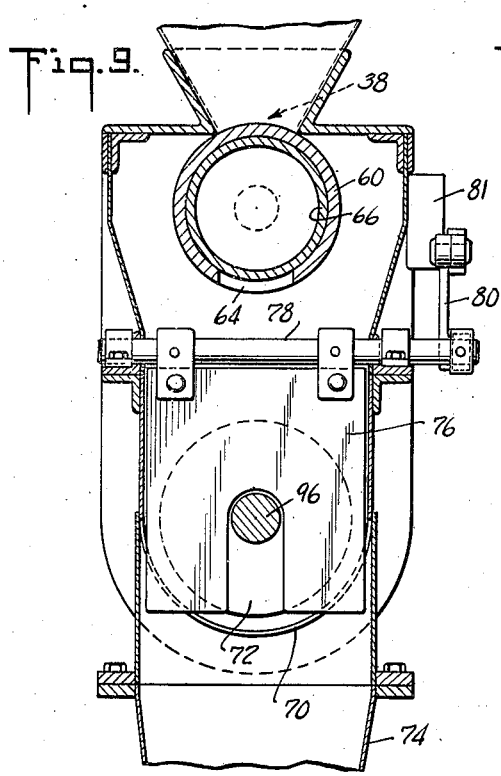
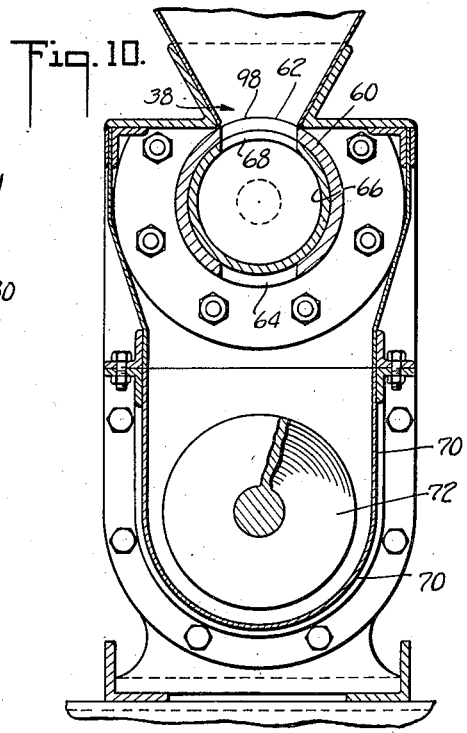
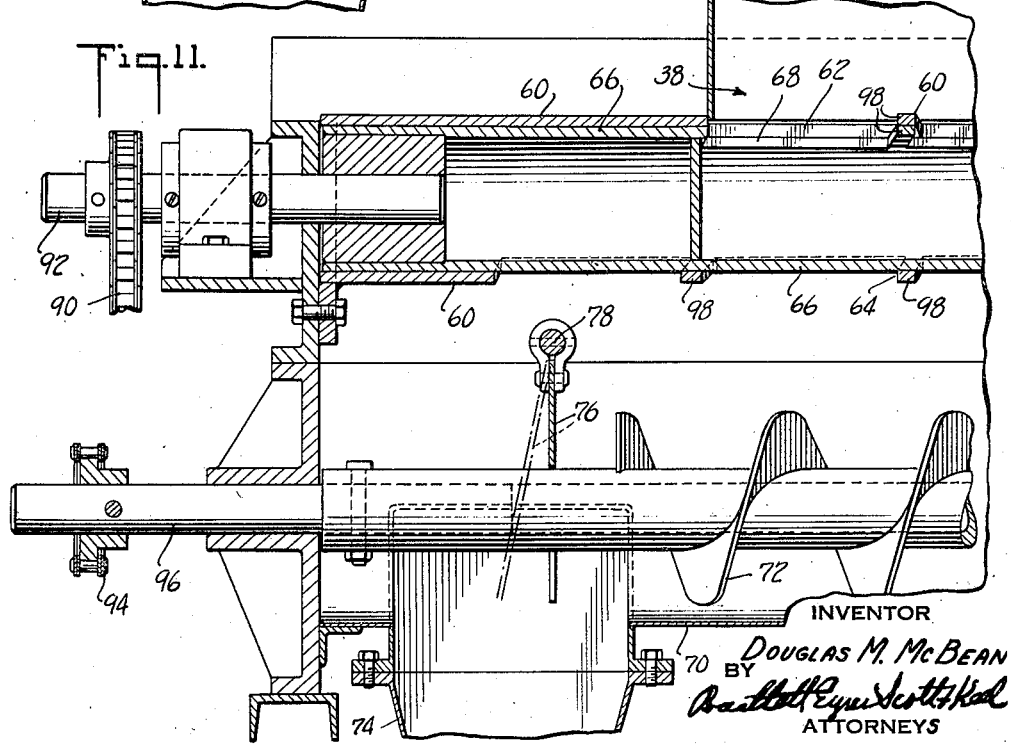
INVENTOR
DOUGLAS M. McBEAN
BY
ATTORNEYS June 15, 1943.  D. M. McBEAN  2,321,838
COFFEE BIN
Filed March 19, 1940   5 Sheets-Sheet 5
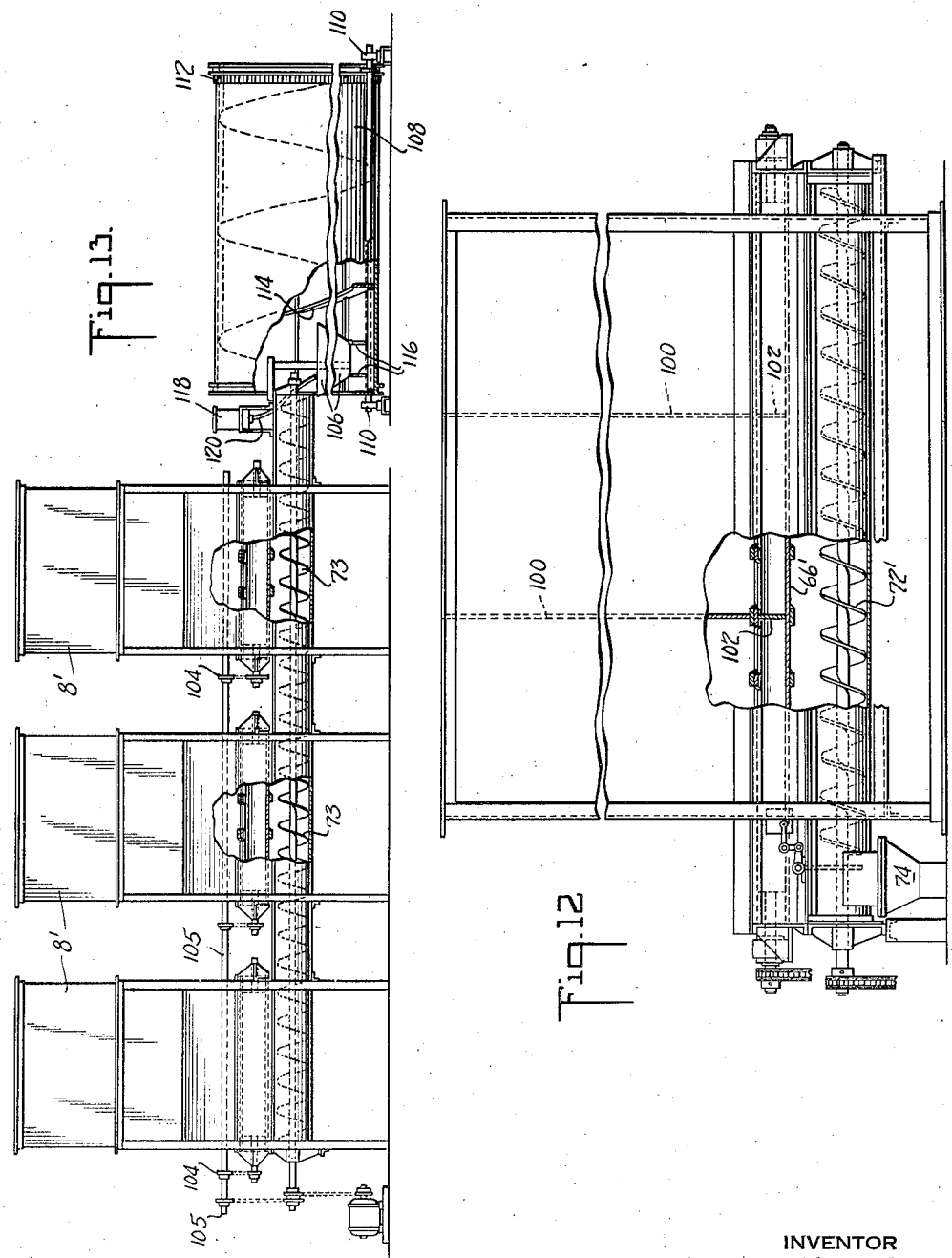
INVENTOR
DOUGLAS M. McBEAN
BY
ATTORNEYS Patented June 15, 1943

2,321,838

UNITED STATES PATENT OFFICE 2,321,838

COFFEE BIN

Douglas M. McBean, Rochester, N. Y., assignor to Beech-Nut Packing Company, Canajoharie, N. Y., a corporation of New York Application March 19, 1940, Serial No. 324,843

2 Claims. (Cl. 214—17)

The present invention relates to an apparatus for handling finely divided material, and has special reference to an apparatus for use in processing coffee.

In the processing of steel cut coffee, or other coffee which is ground relatively coarse or coarser than the conventional drip grind coffee, it is necessary to store it after grinding from 45 to 60 minutes before packing and sealing it in vacuum cans. The reason for this is that the small cubes or particles of coffee contain innumerable gas cells which are under considerable pressure, and it takes approximately that length of time for this gas to escape from the cells in sufficient quantity so that when the coffee is placed in a can and sealed under vacuum, enough gas will not then come out of the coffee to build up an objectionable pressure in the can.

One of the objects of the present invention is to provide an apparatus which is capable of feeding ground coffee from the coffee mill or grinder to the vacuum can-filling machine in such a manner that the required quantity of gas is permitted to escape from the particles of coffee uniformly.

Another of the objects of the invention is to provide a novel and improved apparatus for handling ground coffee and other finely divided material.

A still further object of the invention is to provide an apparatus for blending or mixing finely divided material in a novel and improved manner.

The several features of the invention, whereby the above-mentioned and other objects may be attained, will be readily understood from the following description and accompanying drawings, in which:

Figure 1 is a sectional plan view of the upper portion of the apparatus in its preferred form, in which portion the coffee beans are supplied to the apparatus and ground;

Fig. 2 is a side view of said upper portion of the apparatus with parts broken away to save space;

Fig. 3 is a sectional elevation on an enlarged scale taken substantially on the line 3—3 of Fig. 1;

Fig. 4 is an end elevation of the storage bin portion of the apparatus which receives the ground coffee from the grinder;

Fig. 5 is a side view of the same with certain parts broken away;

Fig. 6 is a sectional plan view, taken on the line 6—6 of Fig. 5;

Fig. 7 is a sectional plan view, taken on the line 7—7 of Fig. 5;

Fig. 8 is a detail sectional view, taken on the line 8—8 of Fig. 7;

Figs. 9 and 10 are sectional views, on an enlarged scale, respectively taken on the lines 9—9 and 10—10 of Fig. 5;

Fig. 11 is a sectional view on an enlarged scale, taken substantially on the line 11—11 of Fig. 4;

Fig. 12 is a view corresponding to Fig. 5 of a modified construction; and

Fig. 13 is a corresponding view but partly diagrammatical of another modified construction.

The apparatus illustrated in Figs. 1 through 11 of the drawings is particularly adapted for use in processing coffee. The apparatus may comprise a coffee mill or grinder (not shown) arranged in a casing 2, a chute or conduit 4 through which the coffee beans are supplied to the coffee mill, and a pipe 6 through which the coffee when ground is discharged from the coffee mill and casing 2.

The ground coffee discharges from the pipe 6 into a bin 8 from which it is delivered in measured quantities, as hereinafter described, to the can-filling machine.

The conduit 4 for supplying the coffee beans to the mill has the opposite sides of its lower portion inclined downwardly and outwardly so as to form a rectangular portion 10 that opens into the upper end of the grinder casing 2. Extending across the lower end of the portion 10 is a wall 12 which is provided with a series of apertures 14. A shutter or damper plate 16 is mounted to slide longitudinally in engagement with the under side of the wall 12 and is provided with a series of openings 18 which when the plate 16 is in one position register with the openings 14 and thus permit the coffee beans to flow from the conduit 4 into the grinder. By moving the damper inwardly the openings 14 may be wholly or partly closed to shut off the flow of the beans.

The damper 16 is thus adapted to be moved to open and close the openings 14 varying degrees by means of a rack 20 on the outer end portion of the damper which is engaged by a pinion 22 secured on a shaft 24. The pinion 22 and shaft 24 is operated by means of a pinion 25 on the shaft 24 which is engaged by a rack 26 secured on the end of a piston rod 28 of a cylinder 30. The piston rod 28 is adapted to be moved outwardly in the direction to open the openings 14 by means of an electric motor driven air compressor 32 which directs air through a pipe 34 into the cylinder back of the piston.

The piston rod 28 and rack-rod 26 are adapted to be moved in the opposite direction to effect closing of the openings 14, by means of a coil spring 36 connected with the rod 26.

With this construction, upon admitting compressed air to the cylinder 30, the damper 16 is moved to close the openings 14 and when the air is released from the cylinder, the spring 36 acts through the rack-rod 26 to move the damper 16 to close the openings 14.

The coffee bin 8 (Figs. 4 and 5) is rectangular and is relatively narrow in cross-section as shown, and has its upper end open. The lower portions of the side walls of the bin are inclined downwardly and inwardly with their lower ends spaced apart to provide a long and narrow opening 38 (Figs. 9 and 10) in the bottom of the bin.

Near the top of the bin 8 there are two screw-conveyors 40 and 41 (Figs. 7 and 8), the shafts 42 of which extend through apertures in the end walls of the bin and are journaled in bearing brackets 44 on the outer sides of the end walls. The shafts 42 are driven by means of a sprocket chain 46 which passes over sprockets on corresponding ends of the shafts and a driving sprocket 47 on the shaft of an electric motor 48.

The end of the pipe 6 through which the ground coffee is fed into the bin, is arranged adjacent the receiving end of the screw conveyor 40.

When the bin has been filled with a quantity of material, the top level of which reaches the screw conveyors 40 and 41, the screw conveyor 40 tends to feed the material longitudinally thereof away from the supply pipe 6. As the material reaches the opposite end of this conveyor, a deflecting plate 50 deflects the material towards the corresponding end of the screw conveyor 41. This conveyor tends to convey the material back to the opposite end thereof against a deflecting plate 52 which tends to deflect the material toward the receiving end of the screw conveyor 40. The screw conveyors are suitably spaced from the side walls of the bin and spaced from each other to cause them to prevent the material from piling up adjacent the lower end of the supply pipe 6 to level off the top of the material in the bin.

Adjacent the discharge end of the screw conveyor 41 is a gate 54 pivoted on a shaft 56. When the material in the bin reaches an excessively high level, the material is forced by the screw 41 against the gate 54 thus forcing the gate to swing outwardly. This movement of the gate acts through an arm 58 and suitable connections to operate a switch 59 to open the circuit connection with the electric motor of the air compressor 34, thus permitting the spring 36 to move the chamber 16 to shut off the feed of the beans to the grinder and hence the feed of the ground coffee into the bin. When the level of the coffee drops below the lower end of the gate 54, the switch 59 operates to close the circuit with the electric motor of the air compressor 32, thus causing the damper 16 to be moved into open position to cause the flow of the coffee beans into the grinder to be resumed. Thus the ground coffee in the bin may be maintained at a substantially uniform level.

In the illustrated construction, means is provided for discharging measured quantities of coffee from the bottom of the bin through the opening 38. As shown, this means comprises a tubular sleeve 60 which is arranged adjacent the underside of the bin and is provided with a longitudinally extending slot 62 which registers with the opening 38 in the bottom of the bin. A corresponding slot 64 is provided in the underside of the sleeve 60.

A tubular sleeve 66 extends through the stationary sleeve 60 and is adapted to be rotated in one direction therein. This rotary or inner sleeve 66 is provided with a longitudinally extending slot 68 which during the rotation of the sleeve 66 in one direction is alternately brought into registry with the slots 62 and 64 in the outer sleeve 60.

In order to insure uniform flow of the material through the bottom of the bin, an inverted V-shaped baffle 61 is located in the center of the bin with its ends extending and secured to the end walls of the bin. The lower edges of the longitudinal sides of this baffle are spaced from the side walls of the bin. Beneath this baffle there is an agitator arranged in such a way that the material coming over the lower edges of the baffle are thoroughly mixed. This agitator consists of a shaft 63 and spokes 65 that are diametrically opposite each other.

With this construction, upon rotation of the inner sleeve 66 at a suitable speed, as the opening 68 registers with the opening 62 the ground coffee is adapted to flow by gravity from the bin into the sleeve 66 so as to fill the sleeve. As the slot 68 passes the slot 62 the latter is closed, and as the slot 68 passes over the slot 64 the contents of the inner sleeve discharges therefrom.

The ground coffee discharged from the sleeve 66 falls into a trough 70 in which there is mounted a screw-conveyor 72. This conveyor 72 rapidly feeds the material discharged into the trough into a chute or conduit 74 through which the material flows downwardly into the hopper of the can-filling machine (not shown).

Extending into the upper portion of the conduit 74 is a gate 76 having its upper end secured on a pivot rod 78. In case the can-filling machine stops or for other reasons the material in the conduit 74 fills the conduit and piles up adjacent the discharge end of the screw-conveyor 72, the material forces the gate outwardly into the dotted line position shown in Fig. 11, whereupon it acts through suitable arm and lever connections 80 to operate a switch 81 to open a circuit connection with an electric motor 82 through which the inner sleeve 66 and the screw propeller 72 are driven, thus stopping the rotation of said sleeve and propeller 72 and hence the feed of the material from the bin. When the level of the material in the conduit drops sufficiently to permit the gate 76 to swing back to its initial position the motor circuit is again closed, thus causing the feed of the material from the bin and into the conduit 74 to be resumed.

The shaft 84 of the electric motor is connected by sprocket chain 86 with any suitable variable speed mechanism contained within a casing 88. This mechanism is connected through sprocket wheels and a chain 90 with a shaft 92 that carries the inner sleeve 66, and is connected through sprocket wheels and a chain 94 with a shaft 96 that carries the screw conveyor 72.

By means of the variable speed drive within the casing 88, the speed of operation of the discharging mechanism connected with the bin 8 may be varied as desired.

The openings or slots in the outer and inner sleeves 60 and 66 have webs 98 (Fig. 6) connecting their side walls, with the webs of the two sleeves set at opposite angles. As the inner sleeve 66 rotates, the angularly arranged webs of the two sleeves when they pass one another have a scissor-like action that serve to cause them to clear themselves of any material accumulating on the webs. The webs 98 prevent warping and lend additional strength to the equipment.

The sleeves 60 and 66 have a clearance between them of approximately .025 of an inch so as to allow for irregularities in machining. The granular material, such as ground coffee, is free to enter said clearance space between the sleeves so as to fill the space, and when this occurs the particles serve as a cushioning and centering means so that the inner sleeve always runs in a centered position and no lubricant is required. The two sleeves are made of dissimilar metal, so that in case of any metal to metal contact no abrasion or galling occurs.

As the inner sleeve 66 is rotated through one revolution, the coffee or other granular material drops into the tube and completely fills it when the opening or slot therein is in its upper position. After it reaches approximately 90 degrees, the slot is cut off, and when it rotates through 180 degrees the material in the sleeve is dumped downwardly upon the screw-conveyor 72 in the trough 70 which carries it to the chute 74 leading to the can-filling machine.

The screw-conveyor 72 is geared in such a way that for one revolution of the sleeve 66, all the material that is dumped upon the conveyor has been carried to the end of the screw and deposited in the chute 74. By means of the variable speed drive for the sleeve 66 and screw-conveyor 72 varied amounts can be drawn from the bin as desired.

It will be apparent with the construction above described that the length of time the particles of coffee take to pass through the bin 8 may be uniformly controlled so as to insure that all particles shall remain in the bin a sufficient time to permit the desired degasification thereof. Such control of the coffee passing through the bin is effected irrespective of variations in the speed of operation of the can-filling machine, or even complete stoppage of the machine. In case of stoppage of the machine, the filling of the chute 74 results in stoppage of the flow of coffee from the bin which in turn results in stoppage of the feeding of the coffee bins to the grinder. Thus the machine is capable of operating automatically to accomplish efficiently and accurately the desired result.

While the machine is particularly adapted for use in handling ground coffee as above described, it will be apparent that it may be used for handling other finely divided material where it is desired to effect a controllable and uniform feed of the material.

The embodiments of the invention illustrated in Figs. 12 and 13 can be used for mixing grains, chicken feed or any other finely divided or dry material.

In the form shown in Fig. 12 the bin is divided by partitions 100 into a plurality of adjoining bins, and the inner sleeve 66' is correspondingly divided by partitions 102.

With this construction for every rotation of the sleeve 66' a proportionate amount of material may be drawn from the several bins and deposited upon a screw-conveyor 72', corresponding to the conveyor 72, which will feed the material to the receptacle or chute 74. The sleeve 66' and the conveyor 72' may be driven by the same mechanism as the corresponding parts of the apparatus first described.

With this form of the apparatus, when used for the described purposes, it is unnecessary to employ the top leveling devices above described.

In the form shown in Fig. 13 three separate bins or hoppers 8' are employed which are spaced apart. Each of these bins has a discharging device comprising a sleeve assembly corresponding to the sleeves 60 and 66. The several inner sleeves of the apparatus are driven through sprocket and chain connections 104 from shaft 105. All three discharging devices discharge upon the common screw-conveyor 73.

With this form of the apparatus by proper gearing of the several discharging devices and the screw-conveyor 73 the discharging device associated with the first bin at the left viewing Fig. 13, may discharge for example three measured quantities of material upon the screw-conveyor. After the screw-conveyor has conveyed this material to the end thereof, the discharging device associated with the next bin may discharge two measured quantities of material, and after this material has been conveyed by the screw-conveyor 73 to the end thereof, the next bin may discharge one measured quantity of material upon the screw-conveyor. By relatively varying the speed of operation of the several discharging devices, the quantities of material withdrawn from the several bins may be varied as desired.

The screw-conveyor 73 may discharge into a hopper 106 which is arranged within and at one end of a horizontal drum 108. This drum is mounted on trunnions 110 and rotates in timed relation to the discharging devices of the several bins and the screw-conveyor 73. The drum may be driven in any suitable manner as by means of a driving pinion which may engage an annular rack 112 on the periphery of the drum. This drum is provided with a spirally arranged blade 114.

When the proper part of the spiral mixer drum arrives directly beneath the hopper 106, a gate or door 116 on the bottom of the hopper 106 is swung open by any suitable means so as to dump the contents of the hopper upon the spiral mixer. Due to the time relation of the drum during one revolution, the batch that has been dumped into the drum has been moved forwardly one thread or pitch of the blade in the large spiral. At that time the next batch delivered to the hopper 106 is dumped into the drum and so on, so that a complete batch is being mixed in each spiral as it passes through the mixing drum. Thus with this mixing device small batches of the materials in their various hoppers may be mixed in a minimum length of time, thereby causing less tumbling damage to the material being mixed. This is particularly advantageous in the case of vegetables and other food products that may be injuriously affected by excess tumbling and mixing. If desired salt, spices or other material may be added to the mixture as it is deposited in the hopper 106. This may be effected by feeding the material from a container 118 through a pipe 120 leading from the container and emptying into the hopper 106.

As will be evident to those skilled in the art, my invention permits various modifications without departing from the spirit thereof or the scope of the appended claims.

What I claim is:

1. In an apparatus of the class described, the combination of an elongated bin for receiving finely divided material, an opening in the bottom of the bin extending the full length thereof, the lower portions of the side walls of the bin being inclined upwardly and outwardly from the longitudinal side walls of said opening and the end walls of the bin being arranged vertically, a stationary sleeve mounted adjacent the under side of the bin and having a longitudinally extending slot in its upper portion registering with said opening in the bottom wall of the bin and having a corresponding diametrically opposed slot in the lower portion thereof, a sleeve substantially fitting the interior of said stationary sleeve mounted to turn therein and having a longitudinally extending slot adapted to register with said upper slot in the stationary sleeve whereby during the rotation thereof the material is adapted to fall by gravity from the bin through said upper slot in the stationary sleeve and into said inner sleeve, and as the slot in the inner sleeve approaches its lowermost position the material is adapted to drop by gravity therethrough, a trough arranged beneath the bin adapted to receive the material as it drops from said sleeve, a screw conveyor mounted in said trough for feeding the material longitudinally thereof in one direction, and means for operating said sleeve and said screw-conveyor in timed relation whereby masses of material are successively removed from the bottom of the bin and delivered to said trough, and each mass is separately discharged by said screw-conveyor before the next succeeding mass is delivered to the trough.

2. In an apparatus of the class described, the combination of an elongated bin for receiving finely divided material, the bin having end walls arranged vertically and side walls extending between the end walls, the bottom of the bin having an opening extending the full length of the space between the end walls, a rotatable valve adapted when in one angular position to receive a measured mass of material from the bottom of the bin the full length of said opening, and when in another angular position to discharge the mass therefrom, a trough beneath the bottom of the bin for receiving each mass discharged by the valve, a device for feeding each mass longitudinally of the trough from beneath said valve and for mixing the material of the mass as it is being fed, and means for rotating the valve and operating said feeding device in timed relation whereby masses of material are successively removed from the bottom of the bin and delivered to said trough, and each mass is separately discharged by said feeding device before the next succeeding mass is delivered to the trough.

DOUGLAS M. McBEAN.